INVENTOR
ANTHONY R. CENFETELLI

BY Ronald J. Clark
ATTORNEY

United States Patent Office 3,426,332

Patented Feb. 4, 1969

3,426,332

DATA HANDLING APPARATUS WITH RECURRENT ADDRESS MANIPULATION TO ACCESS A PLURALITY OF STORAGE AREAS

Anthony R. Cenfetelli, Endicott, N.Y., assignor to International Business Machines Corporation, Armonk, N.Y., a corporation of New York Filed Dec. 15, 1966, Ser. No. 601,887

U.S. Cl. 340—172.5 10 Claims

Int. Cl. G11b *13/00*

ABSTRACT OF THE DISCLOSURE

The present invention is practiced by a data processing system having a central processing unit, and a plurality of peripheral units organized into logical groups and each group being connected to the CPU by a standardized channel. The improvement of the present disclosure relates to an improved mechanism for constructing a sequence of control signal groups, which signal groups are uniquely suited for performing a desired task or functional use. Universal sets of control elements are available from which the improved mechanism is adapted to select individual control elements and construct a desired sequence of control signal groups.

More specifically, the present invention is directed to a recurrent address manipulating mechanism associated with the CPU whereby the instantaneously required list of instructions for controlling one functional use of one peripheral I/O unit is generated from lists of universal segmented instructions just prior to the selection and energization of the selected I/O unit. This generation of a unique list of instantaneously required instructions negates the requirement for storing an instruction list for each and every functional use of each I/O unit. Previously, all the lists are held in storage and a single list or a group of lists are accessed to perform the desired functional use of the I/O unit. This improvement saves the core storage locations required to store the extensive instruction list for controlling each peripheral unit. Additionally, no more than one universal set of control elements are stored in core storage at one time.

Hereinafter, the universal sets of control elements correspond to a direct access storage device such as a disk unit. It is within the intended scope of the appended claims to include any peripheral unit needing control or a combination of peripheral units. In these latter cases, the universal sets of control elements are expanded to meet the added requirements of the system.

A Channel Control Word (CCW) is an assigned name for one of these control signal groups. Each CCW is further subdivided into a plurality of control elements. Related control elements are grouped together into a plurality of tables. This relationship is based upon the general use of the particular control element in the same table. Each of the control elements is adapted for use with any one of a plurality of identically operative units. Each control element directs a separate unsupported portion of a task. The grouping of control elements into a CCW now controls a completely defined unique task. The selection of any one CCW is based on the need of the requesting unit to perform the required task.

A further build are is set aside wherein the control elements from each of the tables are grouped together into a CCW. For example, a typical task might be locating a certain record, reading part of a record, writing part of a record, or moving an accessing mechanism. Additionally, means is available for grouping together these CCW's into a list which controls the operation of an identified peripheral device to perform the desired macrofunction.

Addressing means is provided for identifying the beginning location of each of said tables and arithmetic means is provided for incrementing the addressing means to select a desired control element for transfer to the additional building area. A second addressing means is provided for conveying the control elements from each table to adjacent positions in the building area to build a CCW or control signal group. The second addressing means automatically positions itself to convey or build additional CCW's in contiguous positions in the build area in order to construct a macroinstruction or CCW list.

The average processing system in operation today and the expected processing system to be used in the future require a plurality of peripheral units which load information into the central processing unit or which display or take information from the central processing unit. The present trend is to connect more and more peripheral equipment to a single central processing unit, from which these peripheral units are normally controlled. If the system is operating with a plurality of these I/O units at one time, considerable storage area is employed for storing the list of instruction words used to provide the actual control signals in directing the operation of the I/O device. Use of the present invention would negate the necessity for having all the instruction lists made up before they are needed. An improved system would employ the present invention to construct a list of control words just immediately prior to their use.

It is an object of the present invention to provide an apparatus for automatically handling the transfer of data.

It is a further object of the instant invention to provide an apparatus for automatically selecting electrical signal manifestations from a plurality of storage locations and transferring them in an orderly fashion to a second storage area.

It is another object of the instant invention to provide an apparatus for sequentially interrogating predetermined locations in a storage device, transferring this information to a predetermined second storage location and orderly arranging the data into a new sequence.

It is still a further object of the instant invention to provide an apparatus responsive to first addressing signals to generate second addressing signals employed to locate a first group of electrical signal manifestations and employing second addressing signals for transferring the located signals to a second storage area wherein the electrical signals are grouped together to form a coherent and logical block of second electrical signals.

It is a further object of the instant invention to provide a generalized instruction-building apparatus wherein tables of information are categorized and localized in storage according to common use and means are provided for selecting a desired one of each group. Further means are provided for transferring these groups into a second position in storage and for placing these groups in predetermined order in said second storage area.

The foregoing and other objects, features and advantages of the invention will be apparent from the following more particular description of preferred embodiments of the invention, as illustrated in the accompanying drawings.

Figure 2:
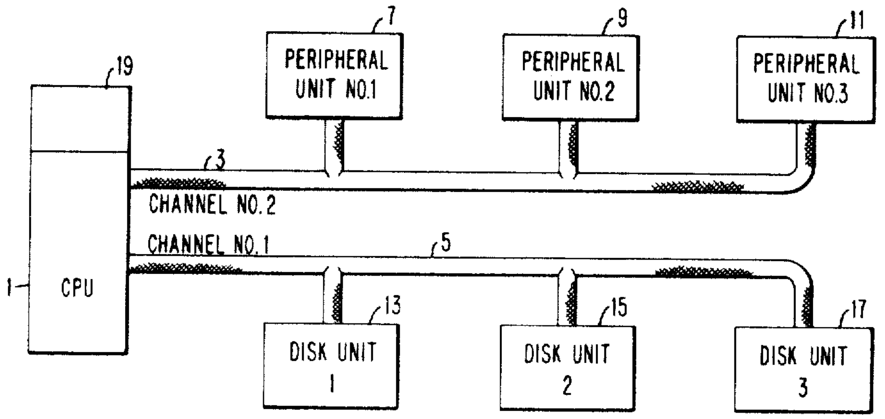
FIG. 2 shows the environment in which the instant invention would be practiced.

Referring to FIG. 2, there can be seen the environment in which the instant invention would be practiced. The central processing unit 1 has attached thereto a plurality of channels 3 and 5. Each of these channels has a plurality of peripheral units communicating therewith. The generalized case is shown with reference to channel 3 wherein undefined peripheral units 7, 9 and 11 are connected in parallel to the channel 3. Each of these peripheral units 7, 9 and 11 is of the same category, for example: all tape units, all printers, all card readers, etc. According to any well-known selection process, one particular peripheral unit on the channel 3 is first selected and then is controlled by CCW's and their resulting control signals, which CCW's are constructed by the mechanism to be described hereinafter. Channel 5 is equipped with a plurality of disk storage units 13, 15 and 17. The instant invention is described in more detail with relation to those channel control words and control elements related to a disk unit. The technique described with reference to the disk unit is applicable to any type of peripheral unit which is attachable to a CPU.

In operation, the CPU 1 would send out signals over a channel 5 to control the many operations which a selected disk unit such as 13 is capable of performing. Normally, in a high speed device such as a disk unit, the functional uses are subdivided into a plurality of chained commands of which each forms a subportion of the functional use. Presently, separate and distinct portions of a functional use are carried in a core storage unit 19 of the CPU and are chained together by addressing techniques whereby a desired functional use is selected and defined. Some time prior to addressing the disk unit 13, groups of these channel control words are assembled and stored in the storage area 19. As many groups are assembled as would possibly be used by a CPU in the operation of a particular program under which the CPU is operating. Presently, similar groups of CCW's must be assembled for each of the disk units 1, 2 and 3. When the CPU is to direct the operation of a disk unit 13, it selects a particular list of CCW's and transmits resulting control signals over the channel 5 in sequence. This sequence is not continuous but is interrupted by the responses by the disk unit 13 that it has performed each increment defined by each CCW in a functional list. But, once the list has been completed, the disk unit 13 in effect has performed a functional task. The present operation does require more processor time to perform, but this time is available to the CPU and essentially does not appreciably delay the performance of a program since a CPU is often times faced with waiting time during the performance of a program. This waiting time is attributed to the slower response time of a peripheral unit when compared to a CPU 1. However, in absolute terms some speed degradation does in fact occur.

Figure 1:
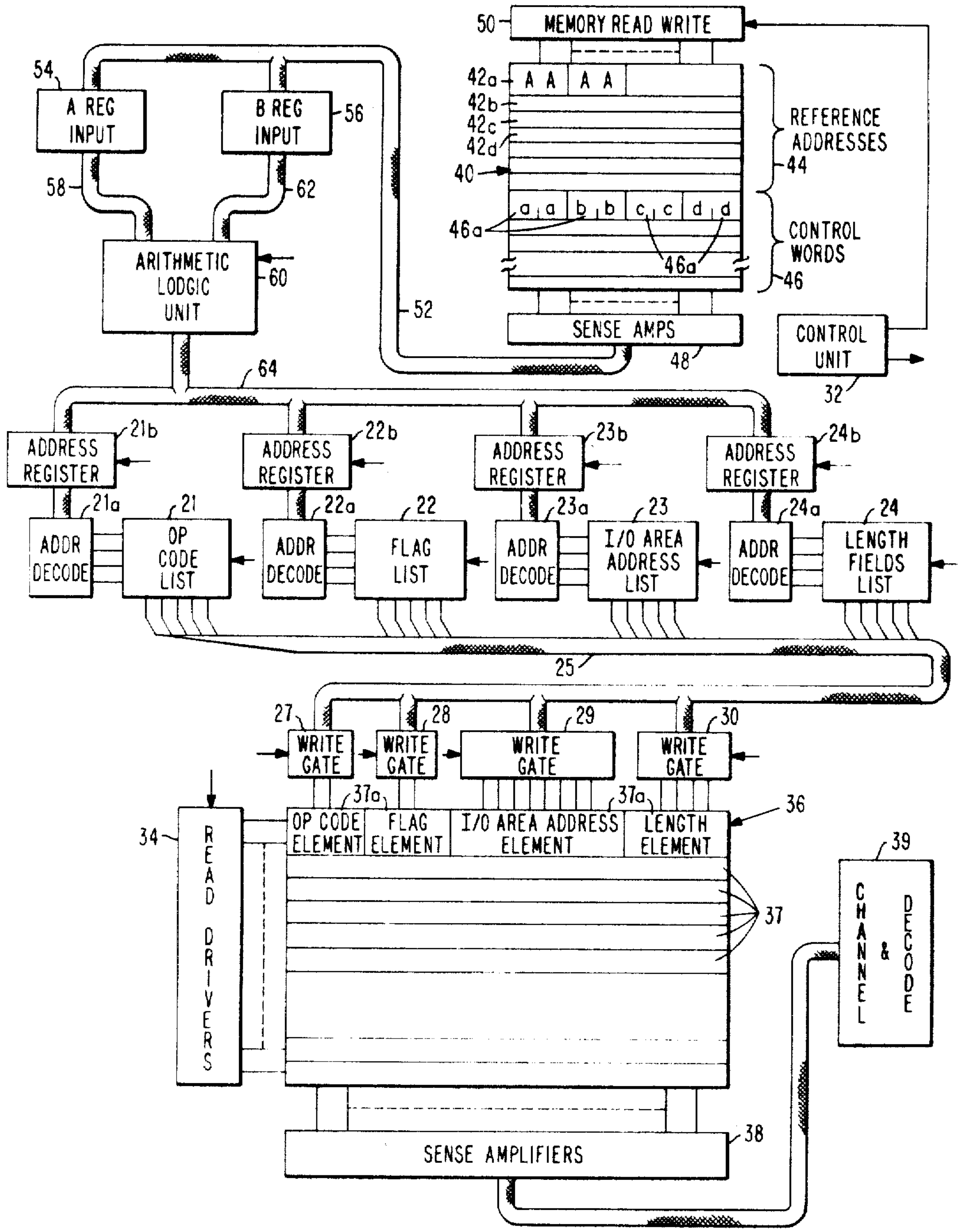
FIG 1 is a first embodiment of the instant invention.

Referring to FIG. 1 there can be seen the preferred embodiment of the instant invention which includes a plurality of separate storage areas 21 through 24. Each of the storage areas has its own address decode circuit identified by the same numeric designator with an added alphabetic character *a*. Each storage area has its own address register identified by the same numeric designator with an alphabetic character *b*. A suitable number of additional storage areas with their accompanying decode circuits and address registers can be provided for any particular CCW having more control elements. Each of the storage areas has access to a common bus 25 which communicates to a plurality of gates 27 through 30. The bus 25 is given the capacity to carry in parallel the largest group of electrical signals read out of a particular storage area 21 through 24. In the alternative, the bus 25 may have a unit capacity wherein the length of the corresponding area in a storage area is a multiple of this unit and a control unit 32 participates in controlling the segmented transfer of the multiple unit width data from the respective storage area to its respective gate 27 through 30.

The plurality of gates 27 through 30 cooperate with a read driver circuit 34 for writing groups of electrical signals into an additional storage area 36. The storage area 36 can be a well-known coincident current memory having a plurality of word positions 37. The length of each word position 37 equals the CCW length, which length is shown in the drawing as extending from left to right in the storage area 36. Each word position comprises a plurality of segments 37*a*. The segments are variable in length to accommodate a control element of identical length transferred from a corresponding area 21 through 24. Each segment is accessed by a respective gate 27 through 30. A sufficient number of word positions 37 are assigned to the storage area 36, which words taken collectively are capable of directing or controlling the most complicated unitary functional use of any I/O device connected to the CPU. The storage area is equipped with a standard sense amplifier circuit 38 which communicates the CCW's to a decode and channel circuit 39.

The third storage area 40 is also divided into word locations 42. A first group 44 of word locations 42 performs a reference function. A second group 46 of word locations 42 performs a control function. Each of the word locations 42 in the second group 46 is further subdivided into sections 46*a*. The storage area 40 is also equipped with a standard sense amplifier circuit 48 and a read driver memory accessing circuit 50. Both of these latter circuits are well known in the prior art. A bus 52 communicates with both an A register circuit 54 and a B register circuit 56. The bus therefore transmits the data from the storage circuit 40 as sensed by the sense amplifier 48 to the A register 54 and B register 56 respectively. The A register 54 has its own individual output bus 58 to a first input of an ALU circuit 60 and the B register 56 has its own bus 62 to a second input of the ALU 60. The output of the ALU is a third bus 64 which communicates in parallel to the address registers 21*b* through 24*b*. Controlling the interoperation of all the enumerated circuits is the control unit 32 which is well known as a microprogram control unit. These control functions are indicated by the input arrows connected to the remaining circuits.

In operation, the reference area 44 of the storage circuit 40 is preloaded to contain offset addresses pointing to the high or low order position of a respective storage area 21 through 24. More specifically, the address in the word area 42*a*, AAAA, identifies the first storage position in the OP code storage area 21. The address indicia in the word area 42*b*, BBBB, identifies the first storage location in the flag byte storage area 22. The address indicia in the word area 42*c*, CCCC, identifies the initial storage location in the input/output storage area 23. The address indicia in the word area 42*d*, DDDD, identifies the first storage location in the length field storage area 24. The control storage area 46 is loaded with additional address indicia identifying an address offset from the first storage position of each respective storage area 21 through 24. Each word length contains as many of these offsets as there are elements in a CCW. There are as many control words in the area 46 as are required to build CCW's to perform a functional task. The control unit 32 operates to interrogate a single word in the area 40, and transfer it to the A register input 54. A corresponding offset portion of a control word in the area 46 is transferred to the B register 52. Registers 54 and 56 are now gated to the ALU and the sum is applied under the control of the control unit 32 to a corresponding address register 21*b* through 24*b*. The reference address is shown as two bytes comprising 4 hexidecimal characters (AAAA) while the offset address is shown as one byte comprising two hexidecimal characters (aa). This is a matter of choice depending on the storage capacity of the various storage areas. The control unit 32 accesses the low order portion of the reference address, adds the offset address, tests for a carry and appropriately adjusts the high order byte of the reference address. The sum address is then placed in a corresponding one of the address registers 21b through 24b.

Using the sum address in the address register 21b through 24b, the addressed location is interrogated and its contents are transferred to its corresponding write gate 27 through 30 respectively for insertion into its respective section 37a. Continuing, successive reference addresses are interrogated with their corresponding offset addresses. A sum address is obtained and transferred to a respective register 21b through 24b. The sum address is used to interrogate a storage area in a respective one of the lists 21 through 24. The contents of the lists supplies one control element of a CCW, which element is transferred through its respective gate to its respective position in the word area 37. This successive and repetitive orderly interrogation system would be operated until all controls words in the area 46 have been interrogated. When this control portion has been depleted, a list of CCW's is contained in the storage ear 36 suitable for controlling a peripheral unit on a channel 3 to perform the designated functional tasks. Now the control unit interrogates the CCW's in order so that the peripheral units will perform access a single byte or a plurality of bytes each time a memory access is made. To be consistent with the descriptive material to follow hereinafter, this decode circuit 74 accesses a single byte at a time. Therefore since the particular list 23 and 24 comprise more than one byte, a corresponding number of accesses must be made to read out the entire list. In general, the byte is the smallest unit of information in the CPU and in this description comprises eight data bits. The coding is in hexidecimal format therefore one byte contains two hexidecimal digits. Responsive to the circuit 74 there is provided a coincident current driver circuit 76 which actually performs the read-out and write-in required to load and interrogate the storage area 70. The storage area 70 is also equipped with a sense amplifier circuit 78 which functions to indicate the electrical manifestations being read out during the current access of the storage area 70. The output of the sense amplifier circuit 78 is applied to the ALU 60. The output of the ALU is applied back to the address register and decode circuit 74.

Referring to Table A, there can be seen a representative OP CODE LIST for storing in the storage area 21.

TABLE A.—OP CODE LIST

| Ref. Addr. | Offset | Op Code | Mnemonic | Meaning |
|---|---|---|---|---|
| AAAA | 0 | 07 | SEEK | Seek Cylinder and track. |
| AAAA | 1 | 08 | TIC | Transfer in channel. |
| AAAA | 2 | 39 | SHA | Search Home Address of track. |
| AAAA | 3 | 31 | SIDE | Search Record Identifier Equal. |
| AAAA | 4 | 23 | SKE | Search Record Key Equal. |
| AAAA | 5 | 69 | SKEH | Search Record Key Equal or High. |
| AAAA | 6 | A9 | SKE(M/T) | Search Record Key Equal with Multitrack. |
| AAAA | 7 | E9 | SKEH(M/T) | Search Record Key Equal or High with Multitrack. |
| AAAA | 8 | 12 | RDID | Read Record Identifier. |
| AAAA | 9 | 06 | RDDTA | Read Data Record. |
| AAAA | A | 0E | RDKD | Read Record Key and Data. |
| AAAA | B | 1E | RDCKD | Read Record Identifier, Key. |
| AAAA | C | 05 | WRDTA | Write Data Record. |
| AAAA | D | 0D | WRKD | Write Record Key and Data. |
| AAAA | E | 1D | WRCKD | Write Record Identifier, Key and Data. |
| AAAA | F | 92 | RDID(M/T) | Read Record Identifier with Multitrack. |

the designated task. Once the designated task has been completed as signaled by the entire interrogation of the CCW's, the contents of area 36 are destroyed so a new list of CCW's can be constructed. Alternatively, the CCW list may be retained and the next list of CCW's would be read thereover. However, care must be taken in the case wherein a subsequent list is shorter than the previous list and previous CCW's might not be added onto the end of a second CCW list. This overreading is prevented by using a Command Chaining (CC) indicator in all but the last CCW. When a CCW is read having no CC indicator, further reading is inhibited.

Figure 3:
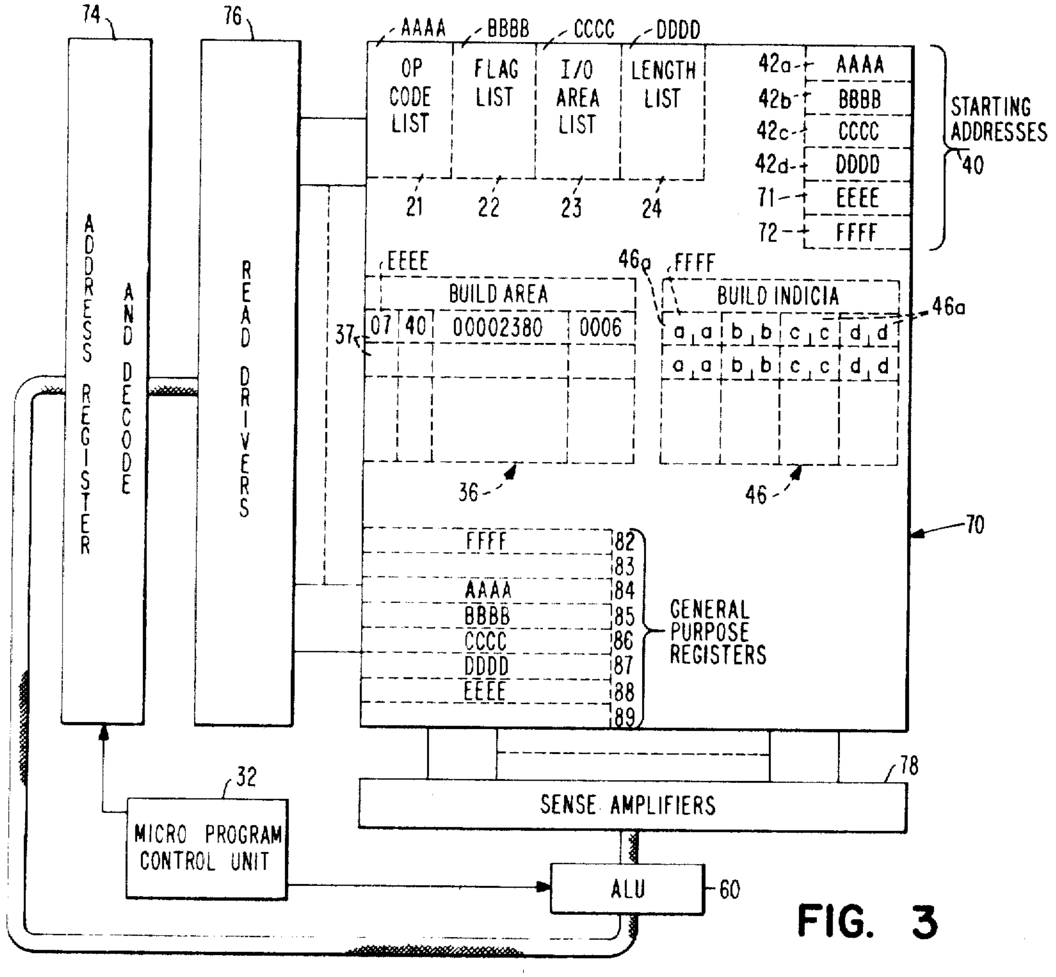
FIG. 3 is a more generalized embodiment of the invention using general-purpose registers of a central processing unit as the means for generating the required address employed throughout the remaining portion of the invention.

Referring to FIG. 3 there can be seen a second embodiment capable of practicing the instant invention. Corresponding elements of FIG. 3 which perform functionally the same as its counterpart in FIG. 1 are given the same identifying designation. Any new circuit or any circuit which combines the operation of two or more circuits shown in FIG. 1 is given a new identifying designator. A single storage area 70 is divided into several special purpose sectors wherein the various control element lists are maintained. Designators 21, 22, 23 and 24 refer to the control element lists which contain a universal set of control elements. The area into which the contents of the control area lists are moved is again identified at 36. The reference addresses are located at 40 and the control word indicia is contained in the area 46. However, two additional reference address words 71 and 72 are included which now identify the low order addresses of the build area 36 and the control word area 46 respectively. In FIG. 1 this function was performed by the control unit which automatically accessed the respective area as required. The address register function of the register 21b through 24b is now performed by general-purpose registers 82 through 89.

The embodiment shown in FIG. 3 is equipped with an address register and decode circuit 74 employed to The first Op Code SEEK is stored at the Reference Address AAAA with an Offset of 0. This Op Code has a hexidecimal representation of 07. In response to this Op Code, the associated disk unit would indent its accessing mechanism to the specified cylinder and track number.

TABLE B.—FLAG BYTE LIST

| Ref. Addr. | Offset | Flag Byte | Meaning |
|---|---|---|---|
| BBBB | 00 | 00 | No Flag Bytes. |
| BBBB | 01 | 10 | Skip data indicator on. |
| BBBB | 02 | 20 | Suppress Incorrect Length Indicator on. |
| BBBB | 03 | 30 | Skip data indicator+Suppress Incorrect Length Indicator on. |
| BBBB | 04 | 40 | Command Chaining Indicator on. |
| BBBB | 05 | 50 | Command Chaining Indicator+ Skip data Indicator. |
| BBBB | 06 | 60 | Command Chaining Indicator+ Suppress Incorrect Length Indicator. |
| BBBB | 07 | 70 | Command Chaining Indicator, Skip data indicator+Suppress Incorrect Length Indicator on. |
| BBBB | 08 | 80 | Data Chaining Indicator on. |
| BBBB | 09 | 90 | Data Chaining Indicator+ Skip data indicator on. |
| BBBB | 0A | A0 | Data Chaining Indicator+ Suppress Incorrect Length Indicator. |
| BBBB | 0B | B0 | Data Chaining Indicator, Suppress Incorrect Length Indicator+Skip data indicator. |
| BBBB | 0C | C0 | Data Chaining Indicator+ Command Chaining Indicator. |
| BBBB | 0D | D0 | Data Chaining Indicator, Command Chaining Indicator +Skip data indicator. |
| BBBB | 0E | E0 | Data Chaining Indicator. Command Chaining Indicator + Suppress Incorrect Length Indicator. |
| BBBB | 0F | F0 | Data Chaining Indicator, Command Chaining Indicator, Suppress Incorrect Length Indicator+Skip data indicator |

Referring to Table B, there can be seen a representative FLAG BYTE LIST for use with a disk unit. At Reference Address location BBBB and Offset 00, the Flag Byte of hexidecimal 00 is located. This Flag Byte has a meaning of No Flag Bytes in the present CCW.

TABLE C.—IO/ AREA LOCATION LIST

| Ref. Addr. | Offset | Addr. | | |
|---|---|---|---|---|
| CCCC | 00 | 00004000 | Location 16,384 | Reserve 512 bytes. |
| CCCC | 04 | 00004200 | Location 16,896 | Reserve 530 bytes. |
| CCCC | 08 | 00004412 | Location 17,426 | Reserve 10 bytes. |
| CCCC | 0C | 00002380 | Location 9,088 | Reserve 10 bytes. |
| CCCC | 10 | 00002F10 | Location 12,048 | |
| CCCC | 14 | 00002F28 | Location 12,072 | |

Referring to Table C, there can be seen the I/O AREA LOCATION LIST. The Reference Address of the first location is CCCC with an Offset of 00. At this location, there is stored a hexidecimal address 4000 equal to 16,384 in decimal. At this address, 512 bytes are reserved for a record input/output area. The length of the area is controlled by the assigning of the next contiguous storage location which is 512 bytes later.

TABLE D.—LENGTH FIELDS LIST

| Ref. Addr.: | Offset | Length Ind. | |
|---|---|---|---|
| DDDD | 00 | 0005 | 5 byte length field. |
| DDDD | 02 | 000A | 10 byte length field. |
| DDDD | 04 | 0006 | 6 byte length field. |
| DDDD | 06 | 0200 | 512 byte length field. |
| DDDD | 08 | 020A | 522 byte length field. |
| DDDD | 0A | 0212 | 530 byte length field. |

Referring to Table D, there can be seen the LENGTH FIELDS LIST starting at Reference Address DDDD and Offset 00, wherein the length list has the four hexidecimal character 0005 indicating a reservation of a five byte length field.

TABLE E.—CHANNEL PROGRAM BUILD AREA DESIGNATORS

| Ref. Addr. | Offset | Word Length (in bytes) |
|---|---|---|
| EEEE | 00 | 8 |
| EEEE | 08 | 8 |
| EEEE | 10 | 8 |
| EEEE | 18 | 8 |
| EEEE | 20 | 8 |
| EEEE | 28 | 8 |
| EEEE | 30 | 8 |
| EEEE | 38 | 8 |
| EEEE | 40 | 8 |

Referring to Table E, there can be seen the CHANNEL PROGRAM BUILD AREA DESIGNATORS which contain indicia for automatically stepping the coincident current drivers 76 throughout adjacent positions of the build area 36. More specifically, the address EEEE and offset of 00 will direct the addressing circuits to the high order position of the first word 37 in the build area 36. At this position, eight bytes of storage will be reserved for storing the CCW under construction. As additional words 37 are required, the new address with an offset of 08 will direct the coincident driving circuit to a next adjacent position. The control unit 32 controls the stepping between segments **37*a***.

TABLE F.—INDICIA FOR BUILDING CCW CHAIN TO WRITE COUNT KEY DATA

| Ref. Addr. | Offset | Indicia |
|---|---|---|
| FFFF | 00 | 00040C04 (aabbccdd) |
| FFFF | 04 | 03040800 |
| FFFF | 08 | 01041000 |
| FFFF | 0C | 0E040402 |
| FFFF | 10 | 03040800 |
| FFFF | 14 | 01041400 |
| FFFF | 18 | 0B130402 |

Referring to Table F, there can be seen the indicia required for building a CCW CHAIN which will perform the functional use of writing the count key and data on a specified record position and the associated units. At the Reference Address designated by the contents of the register 72, shown in FIG. 3, the build indicia is grouped into four bytes or eight hexidecimal characters. The first line of build indicia is generally represented as aabbccdd and more specifically represented as 00040C04. Pairs of hexidecimal characters are summed with their respective Reference Address to select a predetermined control element from a respective list 21 through 24. In the case described one pair of hexidecimal characters is accessed at a time. Therefore, a repetitive accessing of adjacent pairs of characters is the method by which the build indicia is accessed.

The operation of the embodiment shown in FIG. 3 is under program control with interpretation of the program steps being directed by the microprogram control unit 32. The first step in building a group of channel control words is to transfer the starting addresses from the storage area 40 to selected ones of the general-purpose registers 82 through 89. The starting address FFFF of the BUILD INDICIA area is transferred to the general register 82. The reference address of the OP CODE LIST AAAA is transferred to the general register 84. The reference address BBBB of the FLAG LIST is transferred to the general register 85. The reference address CCCC of the I/O AREA LOCATION LIST is transferred to the general register 86. The reference address DDDD of the LENGTH LIST is transferred to the general register 87. The general registers 84 through 87 perform the same function as the address registers **21*b* through 24*b* shown in FIG. 1. The reference address EEEE at which the CCW's are to be constructed is transferred from the starting address register 72 to the general-purpose register 88**.

The sequencing operation of the processor in constructing the repetitive addressing indicia is as follows. A first repetitive address cycle operates to reference the Op Code Offset Address aa and move it to a general register 83. The contents of general registers 83 and 84 now form the two inputs to the ALU 60. The sum is then replaced into general register location 83. The contents of register 83 are now employed to access the specified location in the OP CODE LIST 21. The accessed Op Code is now moved to the location specified by the contents of general register 88. During this cycle, the contents of register 88 is increased by the number of bytes in the Op Code element. In this example, this is one byte long. The address in the general register 88 is now pointing to the next segment in the build area 36. At the same time the contents of register 88 were updated, register 82 is updated by one to point to the next section in the area 46. The address specified by the register 82 is now accessed bringing the bb out of the build area 46 into the general register 83. The general registers 83 and 85 form the inputs to the ALU 60 and the sum generated thereby is replaced into general register 83. The sum address in the general register 83 is employed to access the Flag list 22 bringing out the indicia stored therein into the build area specified by the address in the general register 88. This portion of the repetitive address cycle places a 40 into the Flag list segment of the CCW. At this time, a decode unit (not shown) checks to determine whether the command chaining bit is ON by a parallel decode operation on the flag byte. When command chaining is OFF, offset indicia in additional word positions continue to be accessed.

Referring to Table C, it can be seen that the contents of the 04 position of the Flag List is specified, that the command chaining indicator is ON. This permits the mechanism not only to complete the building of the present CCW but to go on and build an additional CCW. The general register 82 is increased by one to point to the cc portion of the build indicia in the storage area 46 while the contents of the register 88 is increased by one to point to the next segment of the build area 36. Using the address in the register 82, the cc indicia is accessed and transferred to the general register 83. Using the contents of the general registers 83 and 86 as inputs to the ALU 60, a sum address is generated and restored to the general register 83. Using the contents of the general register 83, the I/O area list is accessed and the contents so addressed are moved into the build area 36 specified by the contents of the register 88. In this manner a 00002380 is placed into the next segment in the build area 36.

The contents of the register 82 are increased by one so as to point to the dd in the next section and the contents of register 88 are increased by four pointing to the next segment.

The contents of the register 82 point to the build indicia area 46 and retrieves the dd information for transfer to the general register 83. Using the contents of the general register 83 and 88 as inputs to the ALU, a sum address is generated and returned to the general register 83 position. Now using the contents of the general register 83 the positions specified thereby in the length list 24 are accessed and the information is placed into the next adjacent element position in the build area 36.

Referring to the various tables, more specifically Table F to determine the specific offset indicia and Table D to see what is stored in the offset position, the 04 offset position of the length list is accessed whereby a 0006 is placed into the final segment of the first CCW. The register 82 is increased by one while the register 88 is increased by 2. As a general rule the register 82 is increased by that increment to access the next meaningful data in the build indicia list 46. With the present disclosure, this is one byte position. The register 88 is increased by a variable amount determined by the amount of information read from a list 21 through 24. This manner of incrementing the contents of the registers 82 and 88 presupposes that the offset indicia in the area 46 as well as the segment storage positions in the area 36 are stored in linearly increasing storage positions. Any manner of incrementing may be employed. Corresponding to the embodiment shown in FIGS. 1 and 3, the registers must be incremented an amount to address the next lower word position. The remaining portion of Table F is interrogated in a similar manner as was the first line of indicia 46*a* and corresponding CCW's are transferred to the storage area 36. Upon the accessing of the last build indicia, a flag offset of 13 indicates that the end of the CCW chain has been reached. This terminates the CCW build operation.

The general use of a recurrent addressing mechanism has been described hereinbefore. A plurality of alterations from this general case can be made without departing from the scope of the invention. Among others, control elements can be inserted directly into a corresponding location in the build area. The direct insertion would occur when the offset address contains the same number of characters as the respective offset address required to identify the storage location in which the control element is stored. In such a situation where the storage requirements are equal, an election could be made to make control elements directly insertable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system including a central processing unit operating in response to a storage program, and employing a plurality of input/output peripheral units in communication with said central processing unit over a common interface channel, and said central processing unit controls the operation of said peripheral units by channel control words and their resulting command signals applied to a respective peripheral unit over the channel, wherein the improvement is directed to a recurrent address manipulation mechanism for constructing a channel command word list just prior to its use, comprising, a plurality of first storage areas and each of said first areas including a plurality of element storage positions, a second storage area having a plurality of positions and each position being employed for storing reference address indicia to identify a respective one of said first storage areas, a third storage area having a plurality of word locations and each location further including a plurality of sections for storing offset address indicia to identify a respective one of said element storage positions within a said identified first storage area, a fourth storage area having a plurality of word position and each position including a plurality of storage segments, summing means having a first input circuit and a second input circuit and an output circuit for adding selected address indicia, a control means including;

a first transfer means for transferring a first reference address indicia from one of said positions in said second storage area to said first input circuit and for transferring a corresponding offset address indicia from a corresponding one of said sections of said third circuit area to said second input circuit, and a second transfer means responsive to said output circuit for transferring the contents of a thereby selected storage element position to a corresponding segment in said fourth storage area.

2. A recurrent address manipulation mechanism as recited in claim 1 wherein said first transfer circuit further includes an accessing means comprising:

a first addressing means for storing indicia identifying respective positions of said second storage area, a second addressing means for identifying one of said sections of said third storage area, and said second transfer means further includes a third addressing means for identifying the location of one of said storage segments in said fourth storage area.

3. A recurrent address manipulation mechanism as recited in claim 2 wherein said control means further includes:

incrementing means responsive to said second transfer means for causing said first and second and third addressing means to point to the next sequentially available address location of each respective storage area.

4. In a data processing system including a central processing unit operating in response to a stored program and employing a plurality of input/output peripheral units in communication with said central processing unit over a common interface channel, and said central processing units control the operation of said peripheral units by channel control words and their resulting command signals applied to a respective peripheral unit over the channels, wherein the improvement is directed to a recurrent addressing mechanism for constructing a channel command word list just prior to its use, comprising, a plurality of first storage areas and each of said first areas including a plurality of element storage positions, a second storage area having a plurality of positions and each position being employed for storing reference address indicia to identify a respective one of said first storage areas, a third storage area having a plurality of word locations and each word location further including a plurality of sections for storing offset address indicia to identify a respective one of said element storage positions within a said identified first storage area, a fourth storage area having a plurality of word positions and each position including a plurality of storage segments, summing means having a first input circuit and a second input circuit and an output circuit for adding selected address indicia, a first automatic address and information retrieval circuit including;

first addressing means for identifying a first position of said second storage area and for identifying a first section of said third storage area, means responsive to said first addressing means for interrogating said identified positions and for transferring said identified reference address indicia to said first input circuit, said last mentioned means, being responsive to said first addressing means for interrogating said identified section and for transferring said identified offset address indicia to said second input circuit, a second automatic address and information retrieval circuit including;

second addressing means for identifying a first segment in said fourth storage area, means responsive to the output of said summing means for interrogating an element storage position in one of said first storage areas, transferring means responsive to said last mentioned interrogating means for transferring the contents of said interrogated element storage position to said identified segment of said fourth storage area, and incrementing means responsive to said transferring means for automatically incrementing said first and second addressing means.

5. A recurrent addressing mechanism as recited in claim 4 wherein said incrementing means increments each addressing means a uniform number of positions.

6. A recurrent addressing mechanism as recited in claim 5 wherein said increment means increments certain of said addressing means a greater number of positions than other of said addressing means.

7. In a data processing system including a central processing unit operating in response to a storage program and employing a plurality of input/output peripheral units in communication with said central processing unit over a common interface channel, and said central processing unit controls the operation of said peripheral units by channel control words and their resulting command signals applied to a respective peripheral unit over the channel, wherein the improvement is directed to a recurrent addressing mechanism for constructing a channel command word list just prior to its use, comprising, a plurality of first storage areas and each of said first areas including a plurality of element storage positions, a second storage area having a plurality of positions and each position being employed for storing reference address indicia for identifying a respective one of said first storage areas, a third storage area having a plurality of word location and each word location further including a plurality of sections for storing offset address indicia for identifying a respective one of said element storage positions within a said identified first storage area, means for summing address indicia, first means for accessing a position in said second storage area and a respective section in said third storage area and for transferring said accessed address indicia to said summing means, a fourth storage area having a plurality of word positions and each position including a plurality of storage segments, second means responsive to said control means for accessing one of said location in said fourth storage area, third means responsive to said summing means for accessing an identified element storage position in one of said first storage means, means responsive to said last mentioned means for transferring said accessed element to said location in said fourth area, and means for incrementing said first accessing means to locate a further reference address indicia and a respective offset address indicia.

8. In a data processing system including a central processing unit operating in response to a storage program and employing a plurality of input/ouptut peripheral units in communication with said central processing unit over a common interface channel, and said central processing unit controls the operation of said peripheral units by channel control words and their resulting command signals applied to a respective peripheral unit over the channel wherein the improvement is directed to a recurrent addressing mechanism for constructing a channel command word list just prior to its use comprising, a plurality of first storage areas and each of said first areas including a plurality of element storage positions, a second storage area having a plurality of positions and each position being employed for storing reference address indicia to identify a respective one of said first storage areas, a third storage area having a plurality of word locations and each word location further including a plurality of sections for storing offset address indicia to identify a respective one of said element storage positions within a said identified first storage area, a fourth storage area having a plurality of word positions and each position including a plurality of storage segments, means for summing selected address indicia, means for accessing a position in said second storage area and a respective section in said third storage area and for transferring said accessed address indicia to said summing means, control means for orderly accessing all locations in one word location of said third storage means along with a respective position of said second storage area, said control means further accessing said fourth storage means in a predetermined order and accessing one of said first areas as specified by said summing means, and means responsive to said accessed first storage area for conveying said element control signals to a respective segment in said fourth storage area.

9. A data handling apparatus comprising, a plurality of input/output devices and each of said devices operating in response to a channel command word for performing a desired task, means for storing universal sets of segmented channel command words, means for individually accessing each of said segmented words, means responsive to said accessing means for constructing a plurality of channel command words and for arranging said words into a list having a predetermined order whereby, said list is capable of directing the operation of one of said devices for a functional use.

10. A data handling apparatus comprising, a central processing unit, a plurality of peripheral devices in communicative relationship with said unit and each of said devices operating in response to a channel command word for performing a desired task, means for storing universal sets of segmented channel command words, a storage area, means for transferring selected ones of said segmented channel command words into said storage area, and means for arranging said transferred segments into adjacent positions in said storage area whereby, a list of channel command words is constructed according to the required functional use of a selected peripheral device.

References Cited

UNITED STATES PATENTS

| | | | |
|---|---|---|---|
| 3,251,040 | 5/1966 | Burkholder et al. | 340—172.5 |
| 3,297,994 | 1/1967 | Klein | 340—172.5 |
| 3,297,997 | 1/1967 | Grady et al. | 340—172.5 |
| 3,297,998 | 1/1967 | Klein | 340—172.5 |
| 3,377,619 | 4/1968 | Marsh et al. | 340—172.5 |

OTHER REFERENCES

Beausoleil, W. F., et al.: Data Channel Programming in IBM Technical Disclosure Bulletin 5 (6): pp. 71–73, November 1962.

PAUL J. HENON, *Primary Examiner.*

JOHN P. VANDENBURG, *Assistant Examiner.*